(12) United States Patent
Smith, Jr. et al.

(10) Patent No.: US 7,240,108 B2
(45) Date of Patent: Jul. 3, 2007

(54) CUSTOMIZED TOURS USING HANDHELD DEVICES

(75) Inventors: Newton James Smith, Jr., Austin, TX (US); Herman Rodriguez, Austin, TX (US); Gary Gene Allran, Cary, NC (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 09/942,757

(22) Filed: Aug. 30, 2001

(65) Prior Publication Data

US 2003/0055901 A1 Mar. 20, 2003

(51) Int. Cl.
*G06F 15/16* (2006.01)
*G06F 15/173* (2006.01)

(52) U.S. Cl. ............... 709/223; 709/203; 709/224; 709/245

(58) Field of Classification Search ........... 709/203, 709/223, 224, 245
See application file for complete search history.

(56) References Cited

U.S. PATENT DOCUMENTS

| | | | |
|---|---|---|---|
| 4,030,127 A | 6/1977 | Newman | 360/12 |
| 4,045,741 A | 8/1977 | Missale | 325/470 |
| 4,163,123 A | 7/1979 | Brodsky et al. | 179/15 |
| 4,457,019 A | 6/1984 | Szabo, Jr. et al. | 455/41 |
| 5,020,155 A | 5/1991 | Griffin et al. | 455/617 |
| 5,152,003 A | 9/1992 | Poch | 455/18 |
| 5,819,227 A | 10/1998 | Obuchi | 705/1 |
| 5,852,506 A | 12/1998 | Testani et al. | 359/155 |
| 5,889,473 A | 3/1999 | Wicks | 340/825.44 |
| 6,014,236 A | 1/2000 | Flaherty | 359/118 |
| 6,731,940 B1 * | 5/2004 | Nagendran | 455/456.1 |
| 6,738,808 B1 * | 5/2004 | Zellner et al. | 709/223 |
| 2002/0022453 A1 * | 2/2002 | Balog et al. | 455/41 |
| 2002/0052925 A1 * | 5/2002 | Kim et al. | 709/217 |
| 2002/0111154 A1 * | 8/2002 | Eldering et al. | 455/414 |

(Continued)

FOREIGN PATENT DOCUMENTS

EP 0886383 A1 12/1998

(Continued)

OTHER PUBLICATIONS

U.S. Appl. No. 60/193,816 by Balog et al.*

(Continued)

*Primary Examiner*—Saleh Najjar
*Assistant Examiner*—Benjamin R Bruckart
(74) *Attorney, Agent, or Firm*—John Biggers; Justin Dillon; Biggers & Ohanian, LLP (57) ABSTRACT

Communication of location specific content to client devices including identifying a client device at a location of a location specific device, wherein the client device comprises client device attributes, the client device attributes comprising a client device identification code, and wherein the location specific device comprises a location identification code; recording user preferences for the client device; selecting, in dependence upon the user preferences for the client device and upon the location identification code, content for transmission to the client device; transmitting the selected content through the location specific device to the client device for presentation; and enabling retention of the content within the client device for a period of time.

75 Claims, 3 Drawing Sheets

U.S. PATENT DOCUMENTS

2003/0006912 A1* 1/2003 Brescia .................. 340/990
2004/0261112 A1* 12/2004 Hicks, III et al. ............ 725/89

FOREIGN PATENT DOCUMENTS

| FR | 2682789 | A1 | 4/1993 |
| FR | 2688922 | A1 | 9/1993 |
| FR | 2720573 | A1 | 12/1995 |
| WO | WO 94/11967 | | 5/1994 |
| WO | WO 99/67765 | | 12/1999 |
| WO | WO 00/60436 | | 10/2000 |

OTHER PUBLICATIONS

U.S. Appl. No. 60/228,690 by Kim et al.*

* cited by examiner

Client Device Attributes — 400

- 402 — Client Device Type
- 404 — Display Screen Size
- 406 — Color Availability
- 408 — Audio Availability
- 410 — Video Frame Rate

FIG. 4

User Instructions — 500

- 501 — Start
- 502 — Pause
- 504 — Resume
- 506 — Rewind
- 508 — Fast Forward
- 510 — Change Detail Level
- 512 — Change Program

FIG. 5

Content Record — 600

- 602 — Location Identification Code
- 604 — Preferences
- 606 — Subject
- 608 — Content

FIG. 6

CUSTOMIZED TOURS USING HANDHELD DEVICES

BACKGROUND OF THE INVENTION

1. Field of the Invention

The field of the invention is communications systems, or, more specifically, methods, systems, and products for communication of location specific content to client devices in dependence upon user preferences, the client devices enabled to retain the content for a specified period of time.

2. Description of Related Art

When visiting museums, historic buildings, historic locations, or art galleries, audio tours are often made available via portable cassette players. While these devices provide useful information, there are some problems with the current technology. Since audio cassette tape is a linear delivery mechanism, it forces users to adhere to the order and pacing of the tour designer, requiring that users view the exhibits in a fixed order, not allowing users to re-arrange the order of the tour or skip items they may not be interested in. While some measure of tour customization can be accomplished by using the fast forward and rewind functions of the audio tape player, this can be a cumbersome and frustrating experience. Prior art provides little or no user options regarding preferences, levels of details, changes in program subject, and so on. There is little or no opportunity prior art for users to retain possession of program materials. In addition, the exhibit information is limited to audio only, and does not allow for delivery of more media-rich information about the exhibits such as text, photographs and video. For all these reasons, there is an ongoing need in the art for improved ways of presenting exhibit-related or location specific program content.

SUMMARY

Embodiments of the invention include methods for communication of location specific content to client devices. Typical embodiments include identifying a client device at a location of a location specific device. The client device includes client device attributes, the client device attributes including a client device identification code, and wherein the location specific device includes a location identification code. Typical embodiments also include recording user preferences for the client device; selecting, in dependence upon the user preferences for the client device and upon the location identification code, content for transmission to the client device; transmitting the selected content through the location specific device to the client device for display or to a user's email address; and enabling retention of the content within the client device for a period of time or transmitting selected content to a user's email address.

In typical embodiments of the invention both a location identification code and a client device identification code include a network address. Example embodiments of a client device include a personal digital assistant enabled for wireless data communications, a hand-held personal computer enabled for wireless data communications, or a special purpose device enabled for wireless data communications. Further embodiments include transcoding the content in dependence upon the client device attributes.

In addition to the method aspects of the invention, further aspects of the invention include embodiments as computer systems and computer program products. The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Embodiments of the present invention typically implement two-way exchanges of information between a visitor's client device and a location specific device mounted inside or near an exhibit or other location of interest. As the visitor approaches the exhibit, the location specific device communicates with the visitor's client device and negotiates the appropriate content based on the capabilities of the visitor's client device, as well as the visitor's stated preferences. In many embodiments, wireless delivery of the appropriate data begins immediately, and the visitor navigates through the available information by use of usual graphical interface tools. Since typical embodiments of this invention take advantage of two-way communications between the visitor's client device and the location specific device at the exhibit, the client device capabilities and visitor preferences, language and interests are communicated to the client specific device at the exhibit and customized content is delivered. Two people viewing the same exhibit at the same time, each typically experience narration, additional text, images and video customized to match their interests and the capabilities of their client devices. Content delivered in this manner in some embodiments is provided free of charge for the visitor to retain in storage on the visitor's client device and take away. In other embodiments, the content is limited in usage for a specific period and expires at a date and time in the future or as soon as the user leaves the immediate proximity of the location specific device at the exhibit. An option to purchase portions of this content is presented to visitors in some embodiments, allowing them to choose to keep the content for future reference or allowing it to be automatically deleted.

Embodiments of the invention are useful for trade show events also, for example. Attendees at industry events, such as Comdex, in some embodiments receive marketing materials delivered to a hand-held device when visiting an exhibitor's booth. Embodiments of this kind allow visitors to accept detailed information about products or services being offered. This information is then reviewed at a later time. This information includes live links to providers of products or services. Since this is a two-way exchange, the exhibitor also captures information about visitors (assuming the visitor allows this information to be shared) and optionally performs follow-up contacts.

In this specification, the present invention is described to a large extent in terms of methods for communication of location specific content to client devices. Persons skilled in the art, however, will recognize that any computer system that includes suitable programming means and suitable communications means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory data elements and programmed steps of the method of the invention for execution by a processing unit as computer program instructions, which computer memory includes electronic circuits configured to store data and program instructions. The invention also is embodied in a computer program product, such as a diskette or other recording medium, for use with any suitable data processing system.

Suitable communications means includes any method of wireless data communications including various infrared and radio means including for example wireless LANs implemented in accordance with IEEE standard number 802.11. Suitable communications means includes any method of wireless data communications including various infrared and radio means including for example so-called Bluetooth piconets implemented in accordance with the well known de facto industry standard known as the "Bluetooth Specification," a specification for short range radio links among mobile personal computers, mobile phones, and other portable devices.

Embodiments of a computer program product typically are implemented by use of any recording media for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute" are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects."

The terms "client," "client device," and "device" are used as synonyms in this specification, referring to any device capable of accessing a server through a network. Examples of client devices are hand-held personal computers, special purpose devices that are network enabled, internet-capable personal data organizers, and others that will occur to those of skill in the art. Various embodiments of client devices are capable of wired and/or wireless network access. The use as a client device of any instrument capable of accessing a server through a network is well within the present invention.

A "browser" is a software application typically installed and running upon a client device, the browser operating to download to the client device, from a web server, documents developed in a markup language, display the contents of the documents, and to the extent that the documents include tags identifying other documents to download or other actions to be taken, downloading the documents or taking the actions.

"Content" means digital, location specific, program content. In typical embodiments, content is stored in computer memory for transmission to client devices where it is stored and displayed. Content includes all forms of digital program content including, for example, text, HTML documents, XML documents, graphic images in JPEG files, audio in MP3 files, and video in MPEG files. These forms of content are listed merely for illustration. Many forms of content will occur to those of skill in the art, and they are all well within the scope of the present invention.

"Content server" refers to any computer server coupled for data communications to location specific devices and, through the location specific devices, to client devices. Content servers store and retrieve, under program control, location specific content for transmission to, storage within, and display upon client devices.

"Coupled for data communications" means any form of data communications, wireless, infrared, radio, internet protocols, HTTP protocols, email protocols, networked, direct connections, dedicated phone lines, dial-ups, and other forms of data communications as will occur to those of skill in the art. "Coupled for data communications" includes wireless LAN communications in accordance with IEEE standard 802.11 and also includes wireless radio communication in accordance with the Bluetooth Specification.

"Location specific device" means any device capable of supporting wireless network couplings for data communications with a specific area identified by a location identification code. In some embodiments, the location identification code is a network address. Location specific devices include wireless access points, wireless network ports according to IEEE standard 802.11, and Bluetooth piconet ports as standardized by the Bluetooth Special Interest Group, and HomeRF ports as standardized by the HomeRF Working Group, as well as infrared ports. In typical embodiments of the present invention, location specific devices are coupled for data communications to client devices. In many embodiments of the present invention, location specific devices are coupled for data communications to content servers.

The term "network" is used in this specification to mean any networked coupling for data communications. Examples of networks useful with the invention include wireless LANs according to IEEE standard 802.11, Bluetooth piconets, intranets, extranets, internets, local area networks, wide area networks, and other network arrangements as will occur to those of skill in the art. The use of any networked coupling from client devices to one or more content servers is well within the scope of the present invention.

"World Wide Web," or more simply "the web," refers to the well-known system of internet protocol ("IP") servers that support specially formatted documents, documents formatted in HTML ("HyperText Markup Language"), XML ("Extended Markup Language"), or other languages. The term "web" is used in this specification also to refer to any server or connected group or interconnected groups of servers that implement the HyperText Transport Protocol, "HTTP," regardless whether such servers or groups of servers are coupled to the World Wide Web as such.

DETAILED DESCRIPTION

Figure 1:
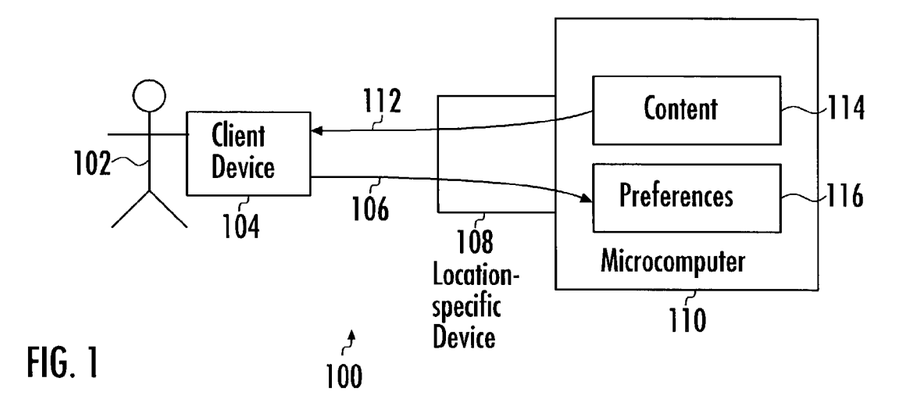
FIG. 1 is a system diagram of an embodiment of the invention in which a source of program content, a microcomputer, is uniquely associated with a location specific device.

Turning now to FIG. 1, a first aspect of the invention is illustrated as an embodiment of a system (100) for communication of location specific content to client devices. The illustrated embodiment includes a hand-held client device (104) carried by a user (102) to the physical location of a location specific device (108). The client device is coupled for data communications through the location specific device to a microcomputer in whose memory is stored digital location specific program content (114) and user preferences (116). The user preferences are entered by the user in typical embodiments, as shown in FIG. 1 at reference (106), through the client device into the memory of the microcomputer (110). In the illustrated embodiment, the location specific content is transmitted through the location specific device to the client device for display. The embodiment of FIG. 1 includes the microcomputer (110) comprising preferences and content uniquely and directly associated with the location specific device so that the content is automatically location specific. The content is delivered directly from the microcomputer through the only location specific device to which the microcomputer is coupled for data communications.

Figure 2:
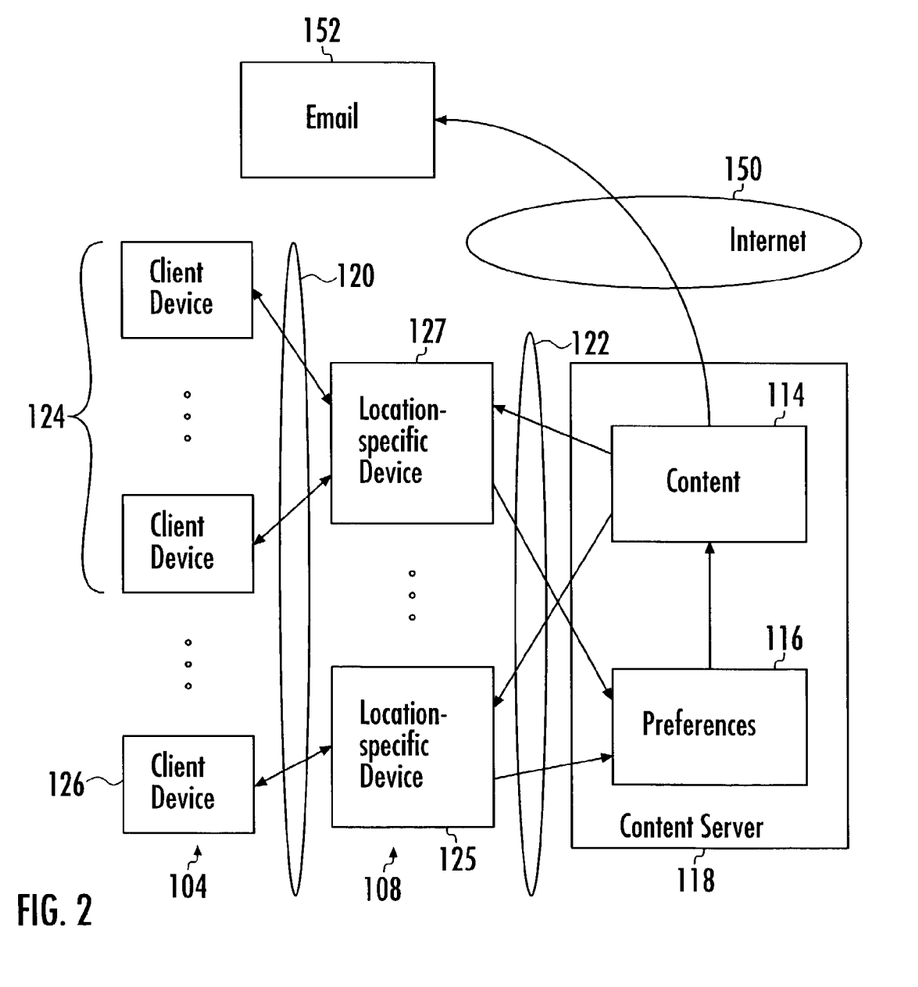
FIG. 2 is a system diagram of an embodiment of the invention in which a source of program content, a content server, is coupled for data communications to a multiplicity of location specific devices.

FIG. 2, on the other hand, shows an embodiment of a more detailed architecture in which the stores of preferences and content are not uniquely associated with a particular location specific device. In embodiments of the kind shown in FIG. 2, the content is keyed by location identification codes, so that content can be delivered on a location specific basis despite the fact that there is no unique association between the stores of content and preferences and any particular location specific device.

More particularly, in the embodiment of FIG. 2, there are a multiplicity of client devices (104) wirelessly coupled for data communications (120) to a multiplicity of location specific devices (108), which are in turn coupled for data communications (122) to a content server (118) in which are stored in computer memory content (114) and user preferences (116). In the embodiment of FIG. 2, a single client device (126) is coupled for data communications through a single location specific device (125). In addition, in the embodiment of FIG. 2, several client devices (124) are coupled for data communications through a single location specific device (127). FIG. 2 also illustrates example embodiments in which content (114) is delivered to subscribing users through an internet coupling (150) in the form of email (152).

Figure 3:
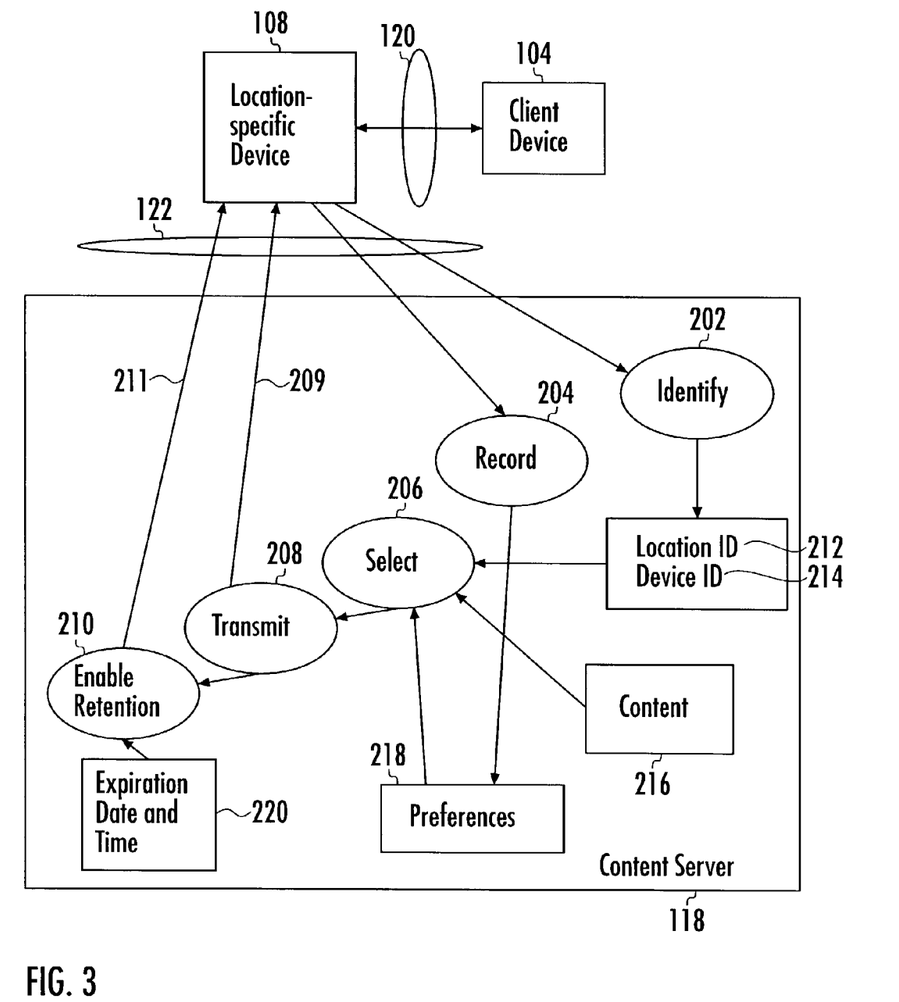
FIG. 3 is a control flow diagram illustrating typical embodiments of the method aspects of the invention.

Turning now to FIG. 3, a further aspect of the invention is illustrated as methods for communication of location specific content to client devices. Typical embodiments as shown in FIG. 3 include identifying (202) a client device (104) at a location of a location specific device (108), wherein the client device includes client device attributes, the client device attributes include a client device identification code, and wherein the location specific device includes a location identification code (212). Typical embodiments also include recording (204) user preferences (218) for the client device and selecting (206), in dependence upon the user preferences (218) for the client device and upon the location identification code (212), content (216) for transmission to the client device. Typical embodiments further include transmitting (208, 209) the selected content through the location specific device (108) to the client device (104) for display, and enabling (210) retention of the content within the client device for a period of time. In many embodiments, a location identification code comprises a network address, and a client device identification code comprises a network address.

Typical embodiments of the kind shown in FIG. 3, include transcoding the content in dependence upon the client device attributes. In typical embodiments a client device may include a personal digital assistant enabled for wireless data communications, a hand-held personal computer enabled for wireless data communications or a special purpose device enabled for wireless data communications. The devices just mentioned are examples only. Many useful client devices enabled for wireless data communication will occur to those of skill in the art, and all such devices are well within the scope of the present invention.

Figure 4:
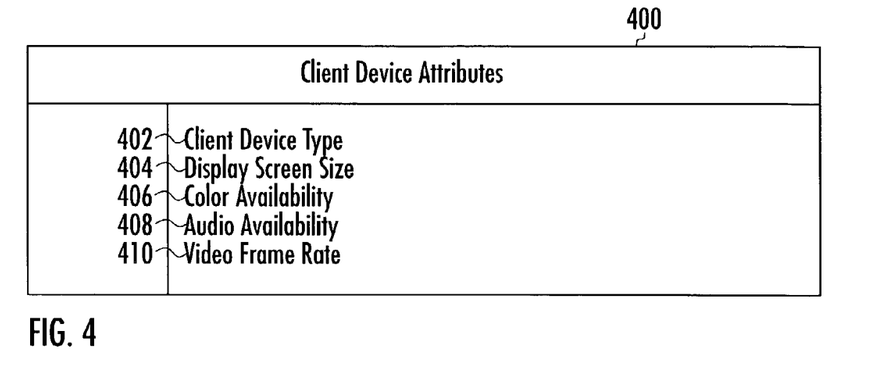
FIG. 4 is an illustration of an example data structure, useful in various embodiments of the invention, to represent client device attributes.

Turning now to FIG. 4, typical embodiments of the invention are shown to include client device attributes (400) including a client device type (402). In typical embodiments, client device attributes include presentation capabilities (404–410), which include display screen size (404), color availability (406), audio availability (408), and video frame rate (410).

Typical embodiments of the kind shown in FIG. 3 also include recording (204) user preferences (218) for use through a particular client device. Typical embodiments include accepting indications of user preference entered by a user through a client device and accepting user instructions entered by a user through a client device.

Figure 5:
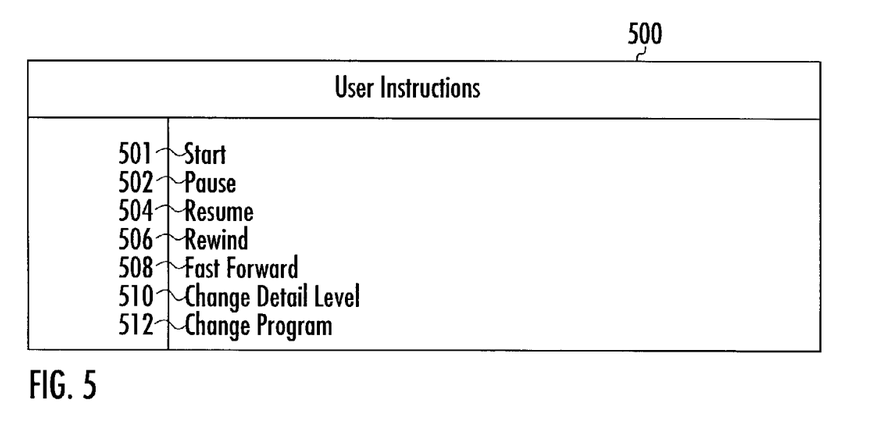
FIG. 5 is an illustration of an example data structure useful in various embodiments of the invention to represent user instructions.

Turning now to FIG. 5, typical embodiments of the invention are illustrated as including user instructions, which user instructions include instructions to start (501), to pause (502), and to resume (504) presentation of content. In typical embodiments user instructions also include an instruction to rewind (506) presentation of content, an instruction to fast forward (508) presentation of content, and an instruction to change the level of detail (510) of content presented. In typical embodiments the content includes programs of audio, video, graphic images, and text, and the user instructions include an instruction to change from one program to another (510).

Turning back to FIG. 3, typical embodiments of invention are seen illustrated as including enabling retention of the content within the client device for a period of time. In typical embodiments enabling retention of the content includes transmitting (210, 211) through the location specific device (108) to the client device (104) an expiration date and time (220) for the selected content transmitted to the device for presentation. In typical embodiments enabling retention (210) of the content within the client device for a period of time further includes altering the expiration date and time. Expiration dates and times are altered, for example, when users license program content for an extended period of usage or purchase program content for permanent retention. Other embodiments include enabling retention of the content within the client device (104) only while the client device is present at the location of the location specific device (108).

Some embodiments of the invention include storing the content in a microcomputer physically located at the location of the location specific device. Other embodiments further include storing the content in a content server located remotely from the location specific device. In embodiments using a content server, the content server is coupled for data communications through a multiplicity of location specific devices to a multiplicity of client devices.

Figure 6:
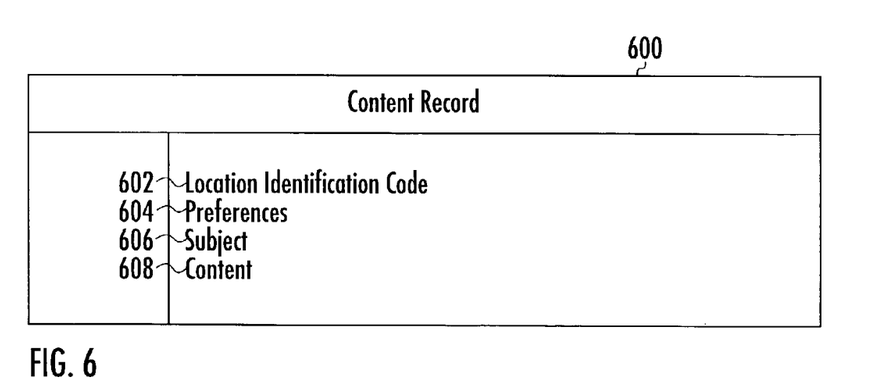
FIG. 6 is an illustration of an example of a data structure useful in various embodiments of the invention to implement content records.

FIG. 6 illustrates an embodiment of a data structure useful in typical embodiments of the invention to store program content in computer memory. The data structure of FIG. 6 includes a field for storing a location identification code (602) identifying the location of a location specific device; a field storing an indication of user preferences (604) wherein user preferences include, for example, language; a field identifying the subject of the program content (606); and the program content itself (508). Some forms of program content are stored directly in the data structure (600), as for example, text. For other forms of content, such as for example video clips or audio programs, the content field (508) contains a pointer or URL representing the location of files containing such other forms of content. In the case of the particular embodiment illustrated in FIG. 6, a database comprising many data structures or records of the kind shown in FIG. 6 is typically sorted or indexed in the sequence shown, that is, first by location, then by preference, then by subject. Of course there are many ways of sorting or indexing program content stored in data structures in computer memory that will occur to those of skill in the art, and all of them are well within the scope of the present invention.

It will be understood from the foregoing description that various modifications and changes may be made in the various embodiments of the present invention without departing from its true spirit. It is intended that the descriptions in this specification are for purposes of illustration only and are not to be construed in a limiting sense. The scope of the present invention is limited only by the language of the following claims.

What is claimed is:

1. A method for communication of location specific content to client devices, the method comprising the steps of:

identifying a client device at a location of a location specific device, wherein the client device comprises client device attributes, the client device attributes comprises a client device identification code, and wherein the location specific device comprises a location identification code;

recording user preferences for the client device;

selecting, in dependence upon the user preferences for the client device and upon the location identification code, content for transmission to the client device;

transmitting the selected content through the location specific device to the client device for presentation; and enabling retention of the content within the client device for a period of time, including transmitting through the location specific device to the client device an expiration date and time for the selected content transmitted to the device for presentation and enabling retention of the content within the client device only while the client device is present at the location of the location specific device.

2. The method of claim 1 wherein the location identification code comprises a network address.

3. The method of claim 1 wherein the client device identification code comprises a network address.

4. The method of claim 1 wherein the client device comprises a personal digital assistant enabled for wireless data communications.

5. The method of claim 1 wherein the client device comprises a hand-held personal computer enabled for wireless data communications.

6. The method of claim 1 wherein the client device comprises a special purpose device enabled for wireless data communications.

7. The method of claim 1 further comprising transcoding the content in dependence upon the client device attributes.

8. The method of claim 1 wherein the client device attributes include a client device type.

9. The method of claim 1 wherein the client device attributes comprise presentation capabilities.

10. The method of claim 9 wherein the presentation capabilities include display screen size.

11. The method of claim 9 wherein the presentation capabilities include color availability.

12. The method of claim 9 wherein the presentation capabilities include audio availability.

13. The method of claim 9 wherein the presentation capabilities include a video frame rate.

14. The method of claim 1 wherein recording user preferences for a client device comprises accepting indications of user preference entered by a user through the client device.

15. The method of claim 1 wherein recording user preference for a client device comprises accepting user instructions entered by a user through the client device.

16. The method of claim 15 wherein user instructions include an instruction to pause presentation of content.

17. The method of claim 15 wherein user instructions include an instruction to resume presentation of content.

18. The method of claim 15 wherein user instructions include an instruction to rewind presentation of content.

19. The method of claim 15 wherein user instructions include an instruction to fast forward presentation of content.

20. The method of claim 15 wherein user instructions include an instructions to change the level of presentation of content.

21. The method of claim 1 wherein the content comprises program and the user instructions include an instruction to change from one program to another.

22. The method of claim 1 wherein enabling retention of the content within the client device for a period of time further comprises altering the expiration date and time.

23. The method of claim 1 further comprising storing the content in a microcomputer physically located at the location of the location specific device.

24. The method of claim 1 further comprising storing the context in a content server location remotely from the location specific device.

25. The method of claim 24 wherein the content server is coupled for data communications through a multiplicity of location specific device is a multiplicity of client devices.

26. A system for communication of location specific content to client devices, the system comprising:

means for identifying a client device at a location of a location specific device, wherein the client device comprises client device attributes, the client device attributes comprising a client device identification code, and wherein the location specific device comprises a location identification code;

means for recording user preferences for the client device;
means for selecting in dependence upon the user preferences for the client device and upon the location identification code, content for transmission to the client device;
means for transmitting the selected content through the location specific device to the client device for presentation; and
means for enabling retention of the content within the client device for period of time, including means for transmitting through the location specific device to the client device an expiration date and time for the selected content transmitted to the device for presentation and means for enabling retention of the content within the client device only while the client device is present at the location of the location specific device.

27. The system of claim 26 wherein the location identification code comprises a network address.

28. The system of claim 26 wherein the client device identification code comprises a network address.

29. The system of claim 26 wherein the client device comprises a personal digital assistant enabled for wireless data communications.

30. The system of claim 26 wherein the client device comprises a hand-held personal computer enabled for wireless data communications.

31. The system of claim 26 wherein the client device comprises a special purpose device enabled for wireless data communications.

32. The system of claim 26 further comprising means for transcoding the content in dependence upon the client device attributes.

33. The system of claim 26 wherein the client device attributes include a client device type.

34. The system of claim 26 wherein the client device attributes comprise presentation capabilities.

35. The system of claim 34 wherein the presentation capabilities include display screen size.

36. The system of claim 34 wherein the presentation capabilities include color availability.

37. The system of claim 34 wherein the presentation capabilities include audio availability.

38. The system of claim 34 wherein the presentation capabilities include a video frame rate.

39. The system of claim 26 wherein means for recording user preferences for a client device comprises means for accepting indications of user preference entered by a user through the client device.

40. The system of claim 26 wherein means for recording user preferences for a client device comprises means for accepting user instructions entered by a user through the client device.

41. The system of claim 26 wherein user instructions include an instruction to pause presentation of content.

42. The system of claim 26 wherein user instructions include an instruction to resume presentation of content.

43. The system of claim 26 wherein user instructions include an instruction to rewind presentation of content.

44. The system of claim 26 wherein user instructions include an instruction to fast forward presentation of content.

45. The system of claim 26 wherein user instructions include an instruction to change the level of detail of presentation of content.

46. The system of claim 26 wherein the content comprises programs and the user instructions include an instruction to change from one program to another.

47. The system of claim 26 wherein means for enabling retention of the content within the client device for a period of time further comprises means for altering the expiration date and time.

48. The system of claim 26 further comprising means for storing the content in a microcomputer physically located at the location of the location specific device.

49. The system of claim 26 further comprising means for storing the content in a content server located remotely from the location specific device.

50. The system of claim 49 wherein the content server is coupled for data communications through a multiplicity of location specific devices to a multiplicity of client devices.

51. A computer program product for communication of location specific content to client devices, the computer program product comprising:
a recording medium;
means, recorded on the recording medium, for identifying a client device at a location of a location specific device, wherein the client device comprises client device attributes, the client device attributes comprising a client device identification code, and wherein the location specific device comprises a location identification code;
means, recorded on the recording medium, for recording user preferences for the client device;
means, recorded on the recording medium, for selecting, in dependence upon the user preferences for the client device and upon the location identification code, content for transmission to the client device;
means, recorded on the recording medium, for transmitting the selected content through the location specific device to the client device for presentation; and
means, recorded on the recording medium, for enabling retention of the content within the client device for a period of time, including means, recorded on the recording medium, for transmitting through the location specific device to the client device an expiration date and time for the selected content transmitted to the device for presentation and means, recorded on the recording medium, for enabling retention of the content within the client device only while the client device is present at the location of the location specific device.

52. The computer program product of claim 51 wherein the location identification code comprises a network address.

53. The computer program product of claim 51 wherein the client device identification code comprises a network address.

54. The computer program product of claim 51 wherein the client device comprises a personal digital assistant enabled for wireless data communications.

55. The computer program product of claim 51 wherein the client device comprises a hand-held personal computer enabled for wireless data communications.

56. The computer program product of claim 51 wherein the client device comprises a special purpose device enabled for wireless data communications.

57. The computer program product of claim 51 further comprising means, recorded on the recording medium, for transcoding the content in dependence upon the client device attributes.

58. The computer program product of claim 51 wherein the client device attributes include a client device type.

59. The computer program product of claim 51 wherein the client device attributes comprise presentation capabilities.

60. The computer program product of claim 59 wherein the presentation capabilities include display screen size.

61. The computer program product of claim 59 wherein the presentation capabilities include color availability.

62. The computer program product of claim 59 wherein the presentation capabilities include audio availability.

63. The computer program product of claim 59 wherein the presentation capabilities include a video frame rate.

64. The computer program product of claim 51 wherein means, recorded on the recording medium, for recording user preferences for a client device comprises means, recorded on the recording medium, for accepting indications of user preference entered by a user through the client device.

65. The computer program product of claim 51 wherein means, recorded on the recording medium, for recording user preferences for a client device comprises means, recorded on the recording medium, for accepting user instructions entered by a user through the client device.

66. The computer program product of claim 51 wherein user instructions include an instruction to pause presentation of content.

67. The computer program product of claim 51 wherein user instructions include an instruction to resume presentation of content.

68. The computer program product of claim 51 wherein user instructions include an instruction to rewind presentation of content.

69. The computer program product of claim 51 wherein user instructions include an instruction to fast forward presentation of content.

70. The computer program product of claim 51 wherein user instructions include an instruction to change the level of detail of presentation of content.

71. The computer program product of claim 51 wherein the content comprises programs and the user instructions include an instruction to change from one program to another.

72. The computer program product of claim 51 wherein means, recorded on the recording medium, for enabling retention of the content within the client device for a period of time further comprises means, recorded on the recording medium, for altering the expiration date and time.

73. The computer program product of claim 51 further comprising means, recorded on the recording medium, for storing the content in a microcomputer physically located at the location of the location specific device.

74. The computer program product of claim 51 further comprising means, recorded on the recording medium, for storing the content in a content server located remotely from the location specific device.

75. The computer program product of claim 74 wherein the content server is coupled for data communications through a multiplicity of location specific devices to a multiplicity of client devices.

* * * * *